Feb. 6, 1940.  E. L. TRANAAS ET AL  2,189,186

DUMPING VEHICLE AND DOOR OPERATING MEANS THEREFOR

Filed Jan. 14, 1937  7 Sheets-Sheet 1

Inventor
EMIL L. TRANAAS.
GENE L. OMON.

Inventor
EMIL L. TRANAAS.
GENE L. OMON.

Inventors
EMIL L. TRANAAS.
GENE L. OMON.

Feb. 6, 1940.   E. L. TRANAAS ET AL   2,189,186
DUMPING VEHICLE AND DOOR OPERATING MEANS THEREFOR
Filed Jan. 14, 1937   7 Sheets-Sheet 7

Inventor
EMIL L. TRANAAS.
GENE L. OMON.

Patented Feb. 6, 1940

2,189,186

UNITED STATES PATENT OFFICE 2,189,186

DUMPING VEHICLE AND DOOR OPERATING MEANS THEREFOR

Emil L. Tranaas and Gene L. Omon, Milwaukee, Wis., assignors to Koehring Company, Milwaukee, Wis., a corporation of Wisconsin Application January 14, 1937, Serial No. 120,588

7 Claims. (Cl. 298—35)

The present invention appertains to dumping vehicles, primarily of the type equipped with bottom dump doors and involving the use of manually controlled instrumentalities for tripping suitable mechanism to cause the opening of the doors as when discharging and dumping, and for throwing into action automatic operating devices to effect the closing of said doors.

The invention involves novel means for accomplishing the above mentioned operations, and in addition thereto the invention comprises improved mechanism for the automatic discontinuance, and latching out of operation, of the instrumentalities employed for effecting the closing movement of the doors, after the vehicle with which they are equipped has been dumped or discharged of its load.

The door closing mechanism forming a part of the invention involves novel reciprocable means as a part of the actuating mechanism that effects the closing of the doors automatically when such mechanism is initiated in its operation under manual control, and said reciprocable means are adapted, according to the novel construction of the invention, to be rendered inoperative when the doors reach their closed positions or when they are arrested in their movement near their closed positions by resistance of an obstacle caught between the adjacent edges of the doors as they come together in closing.

In respect to the automatic door closing means forming a part of this invention, it is notable that the same comprises novel pawl and ratchet mechanism adapted to be driven from a moving part of the vehicle such as a wheel, together with actuating parts for said pawl and ratchet mechanism including the reciprocally movable means before mentioned, which consists of a special type of resilient connector adapted to automatically expand and contract in its operation in order to perform certain functions in relation to those actuating devices that are directly operated from the moving part of the vehicle and in relation to certain parts of the pawl and ratchet mechanism.

The invention involves furthermore other details of construction of the various instrumentalities included in the foregoing resume, and an understanding of which will be more readily had upon reference to the following description in conjunction with the annexed drawings, in which—

Figure 1:
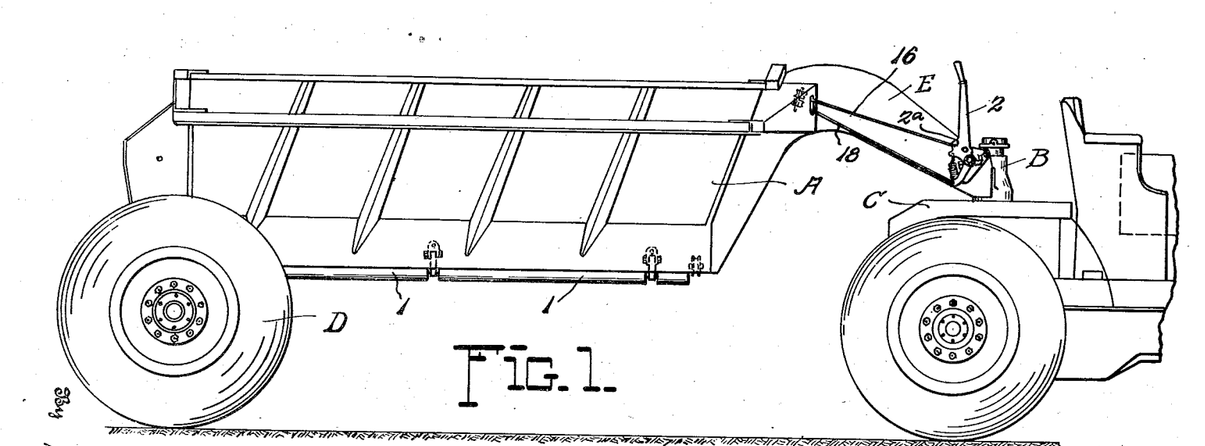
Figure 1 is a side view of a trailer type dumping vehicle, or wagon as the same is sometimes called, embodying the invention.

Referring to Figure 1 of the drawings, a trailer type dumping vehicle is illustrated as comprising the dumping body A, the front end of which is detachably or otherwise connected at B to a tractor vehicle or truck C which will be preferably of the four-wheel type. The dumping vehicle A has its body supported at the rear end thereof by a pair of supporting wheels D and said body is equipped with bottom dump doors 1 of any suitable type. Upon the front hitch member E of the dumping vehicle A is carried the main manual control means for controlling the dumping and closing action of the doors 1 aforesaid, said means comprising the lever 2 and certain other parts shortly to be described.

Figure 12:
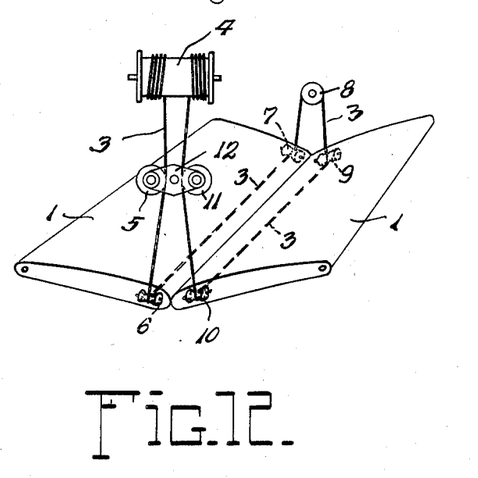
Figure 12 is a somewhat diagrammatic view illustrating the wind or door closing drum and the method of training the cables leading therefrom to the doors, by which cables the doors are permitted to open and afterwards pulled to their closed positions.
Figure 16:
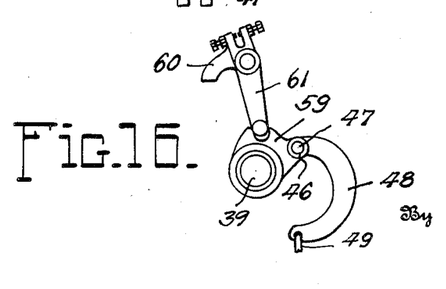
Figure 16 is a view similar to Figure 15, but showing the said collar after it has been shifted upon completion of the latch-out action of the mechanism.

It is immaterial to the invention whether the same is applied to a trailer type dumping vehicle A, or to a four-wheel type vehicle as compared with the vehicle A, which may be characterized as a semi-trailer because it only avails of two rear wheels in its construction. Reference is made to Figure 12 to give a general idea of the door arrangement. Here it will be seen that the doors 1 have outer pivotal edge portions supported by any suitable pivot means inconsequential to the invention, the inner edge portions of the doors adapted to abut ordinarily when they are closed. In order to close these doors 1 and permit them to open, a cable 3 has one end thereof adapted to wind around the drum 4, and from thence leads around a pulley 5 to pulleys 6 and 7 adjacent the free edge portions of one of the doors 1. Thence the cable 3 passes upwardly around a guide pulley or sheave 8, thence downwardly over pulleys 9 and 10 similarly arranged as are the pulleys 6 and 7, but carried by the other door 1, and from the pulley 10 the cable 3 leads over the guide pulley 11 on the same bracket support 12 that carries the pulley 5. From the pulley 11 the cable 3 leads back to the drum 4 and is wound about the latter in the same direction as the first mentioned end of the cable.

It will be understood that by turning the drum 4 in one direction the end portions of the cables 3 will wind about the drum in one direction and will exert a pull upon the doors 1 when they are in open position to move these doors to a closed position. It will also be clear that when the drum 4 is released the pull or tension on the cables will be relieved and the weight of the doors 1 alone, or the said doors and any load of dirt and other material in the dump body A, will cause the doors 1 to lower instantly to open positions.

Figure 17A:
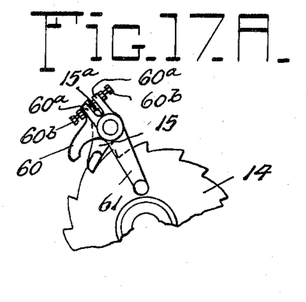
Figure 17A is a view of the working or wind pawl and associated bell crank part engaged with the ratchet wheel of the drum.
Figure 17B:
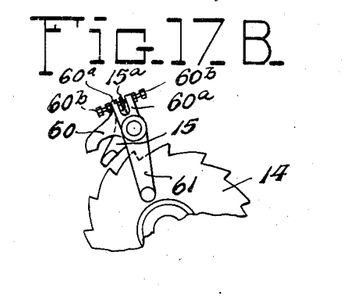
Figure 17B is a view similar to 17A but showing the said working or wind pawl disengaged, with associated parts in proper position at such time.

Now the mechanism of the present invention deals largely with the means employed to release the drum 4 in order to open the doors 1, and to initiate operation of automatic devices that will cause a closing movement of said doors. For the above purpose certain ratchet mechanism is resorted to, the same including a ratchet pawl herein called the locking ratchet pawl 13, see Figure 4, adapted to be latched out of engagement with a ratchet wheel 14 fixed to the drum 4 whereby to release the drum for a turning movement that permits the paying out of the cable 3 and dumping movement of the doors. Other ratchet mechanism, see Figures 17A and 17B, including a wind ratchet pawl 15 coacting with the ratchet wheel 14, is employed to cause a winding of the cable means upon the drum 4, to raise the doors 1 to their closed positions. The actuating means for the locking pawl 13 is manual and comprises the lever 2 previously referred to, which is connected by a chain or cable 16 that leads directly from the point of attachment 2a over suitable guide means such as pulleys or the like, to supporting lever 17 upon which the pawl 13 is mounted.

On the other hand, the manual control lever 2 is connected by means to be later described, including another chain or cable 18 which leads over suitable guide means to a starting lever assembly including the lever 19, which starting lever assembly, in conjunction with other features of construction, is adapted to initiate the operation of the automatic devices by which the wind or working pawl 15 is caused to cooperate with the ratchet wheel 14 for causing winding of the cable means 3 upon the drum 4 and closing of the doors 1 of the vehicle.

Before going into detail in describing the operating features above referred to, it is noted that a forward movement of the lever 2 causes opening of the doors 1 and a return movement of said lever will initiate the closing operation of said doors by the automatic closing mechanism.

Drive means for the automatic door closing mechanism

Figure 6:
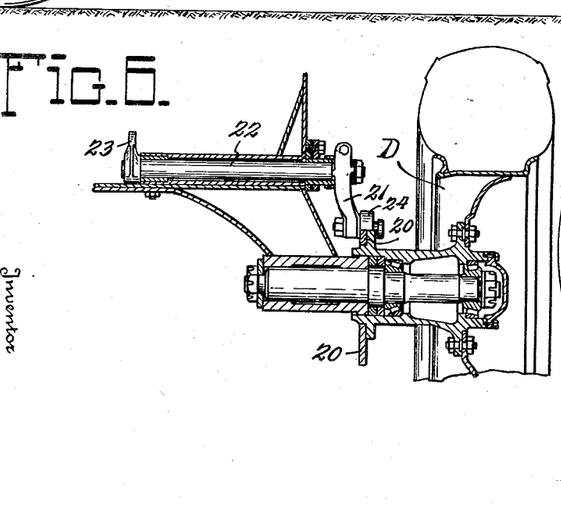
Figure 6 is a partial transverse sectional view illustrating the driving cam carried by one of the rear supporting wheels of the dump body of the vehicle, and the manner in which the said cam cooperates with the actuating rocker arm carried by a rocker shaft that cooperates with the reciprocating device which effects the winding of the cables for closing the dump body doors.
Figure 7:
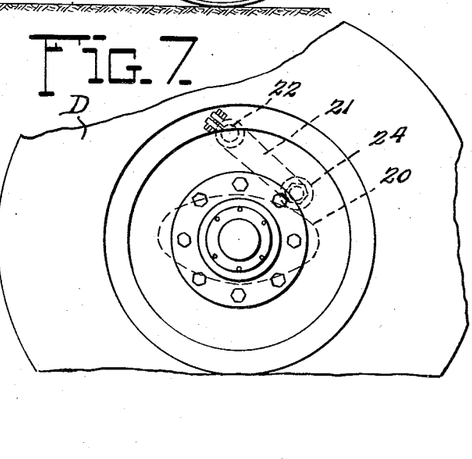
Figure 7 is a fragmentary elevation of the construction shown in Figure 6, illustrating more clearly the form of the actuating cam for the door wind mechanism.

Reference is made to Figures 6 and 7. One of the rear wheels D supporting the body of the dumping vehicle A is equipped with a double ended cam 20, see Figure 7, which turns with the wheel and is adapted to engage a rocker arm 21 on rock shaft 22. The rock shaft 22 in turn is equipped with an actuating arm 23 at the end opposite that which carries the arm 21. The arm 21 has a roller 24 that traverses the periphery of the cam 20. Obviously, as the wheel D rotates during the travel movement of the vehicle A, the cam 20 is rotated, and so long as the rocker arm 21 is in the path of movement of said cam, said arm 21 will be raised thereby and lowered under the action of spring 49. Similarly, the shaft 22 will be rocked and the arm 23 will be correspondingly rocked up and down. It is this actuation of the shaft 22 and arm 23 which, through a reciprocatory device to be later described, causes actuation of the working or wind ratchet pawl 15, to effect the winding movement of the drum 4.

Manual control lever and associated operating parts

Figures 2, 2A, 3:
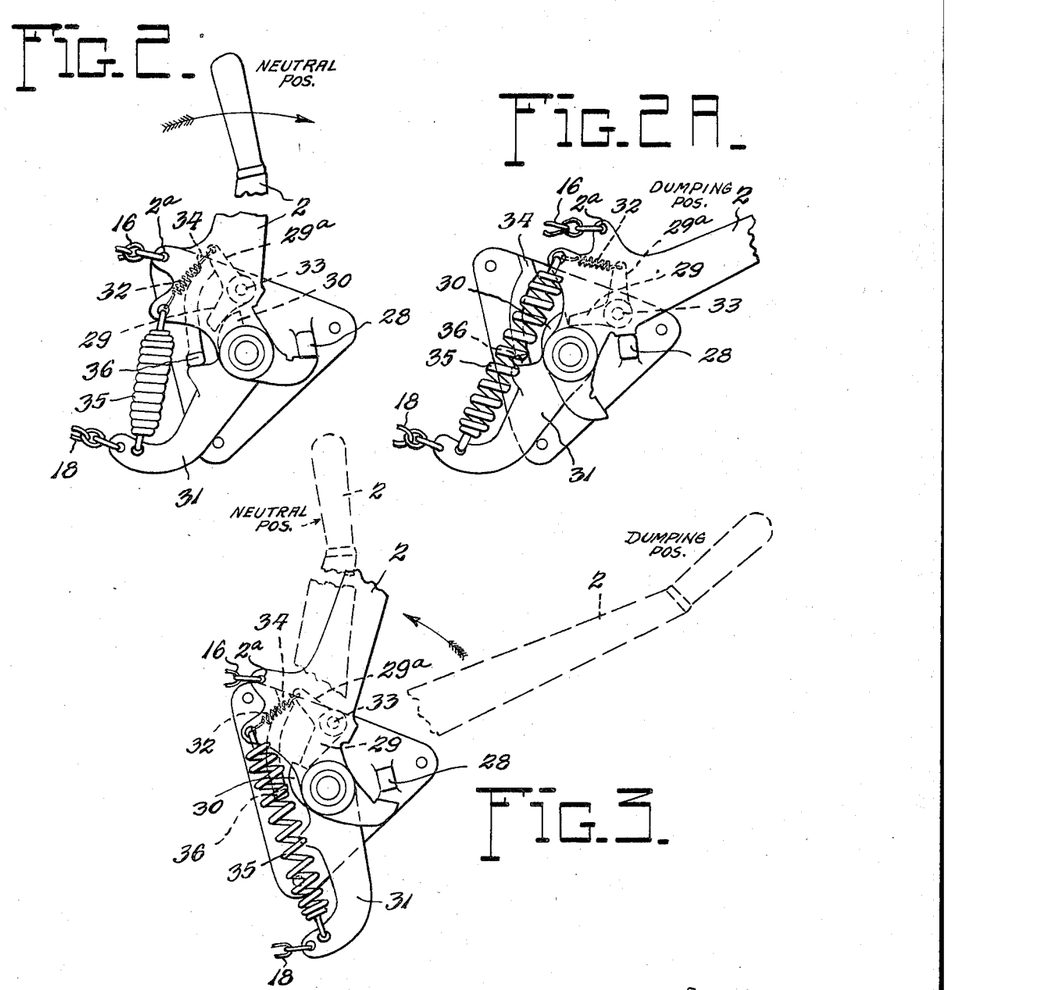
Figure 2 is a side view of the manual control lever and associated parts by which the dumping doors of the vehicle are released and by which the operation of the automatic door closing mechanism is initiated, the said means being disposed in its normal or neutral position.
Figure 2A is a view of the same means as shown in Figure 2, excepting that the control lever has been moved to a position to effect release or dumping of the doors of the vehicle.
Figure 3 is a view of the same mechanism as shown in Figures 2 and 2A, but illustrating the control lever in full lines cooperating with the associated parts for effecting a pull upon the lower operating cable whereby to initiate the operation of the automatic door closing mechanism.

Reference is now made to Figures 2, 2A and 3 particularly. In Figure 2 the control lever assembly is disposed in what is termed its neutral or normal position, as when the doors of the vehicle A are closed and the wind mechanism is latched-out, so to speak, or rendered inoperative. The wagon or vehicle is now ready to be loaded since the doors 1 are closed and maintained closed by the ratchet 14 through the engagement of the locking pawl 13.

Bearing in mind that the chain 16 connects the lever 2 directly with the supporting lever 17 which carries the ratchet locking pawl 13, a forward pull of the lever will lift the pawl 13 from the ratchet teeth of the wheel 14, thereby releasing the drum 4 and permitting the cables 3 to unwind therefrom to substantially instantly permit the opening of the doors 1 and depositing of the load in the vehicle A upon the ground or other surface where it is to be delivered. The lever 17 is pivotally supported at 25 and the pawl 13 is pivoted at 26 between its ends to said lever 17, a spring 27 normally acting upon the tail or outer end of the pawl 13 to tend to hold it in engagement with the ratchet wheel 14. The lever 17 in conjunction with the pawl 13 comprises virtually a toggle assembly. The upward movement of the lever 17 under the actuation of the control lever 2 causes the pawl 13 to tilt or rock until its nose escapes from the teeth of the wheel 14 in a manner shown clearly in Figures 4 and 5. The forward movement of the lever 2 in the wagon dumping operation is limited by engagement of the said lever with a stop lug 28, see Figures 2, 2A and 3.

On the lever 2 is carried a pivoted dog 29, which, when the lever 2 reaches its forward limit of movement as shown in Figure 2A, engages in front of a tooth 30 adjacent to the hub portion of a trip lever 31, the said engaging action of the dog being enforced by a coiled spring 32 connected with an arm 29a offstanding from the axis portion of the dog 29 which is pivoted at 33.

It will be evident from the foregoing that when the dog 29 is engaged in front of the tooth of the lug 30 of lever 31, the control lever 2 is locked to the lever 31, so that upon subsequent rearward movement of the lever 2 from the position in which it is shown in Figure 2A, to carry the same to the position of the full lines in Figure 3, the pull lever 31 will be actuated by rocking the same forwardly. The trip lever 31 is connected with the chain or cable 18 previously referred to.

The action of movement of the control lever 2 rearwardly as just referred to is that required for effecting a closing movement of the doors 1 which were opened by the previous mentioned forward movement of the lever 2. In accomplishing the closing movement of the doors 1, the trip lever 31 and its chain or cable 18 are adapted to initiate the operation of automatic mechanism which causes the winding of the cable means 3 back on the drum 4 from which said cable means has unwound in order to permit the previous opening of the doors 1.

Referring to Figure 3 of the drawings, the parts of the trip and control lever assembly are in the positions assumed thereby after having initiated the operation of the automatic acting cable wind mechanism. In this figure the lever 2 has been pushed backwardly from its dumping position of Figure 2A, thereby moving the trip lever 31 forwardly and transmitting a pull upon the chain or cable 18 which is connected to the starting lever 19 previously mentioned herein. When the lever 2 is moved backward, in the manner stated, to the position shown in Figure 3 in full lines, the arm 29a of the dog 29 that locks the lever 2 and the lever 31 together, strikes a stop lug 34, this action being depicted in Figure 3 as just taking place, and the further backward movement of the lever 2 from its full line position in Figure 3 to its rearmost dotted line position causes the dog 29 to be raised out of engagement from the tooth 30. As soon as this happens, the spring 35 which is connected with the lower end of the trip lever 31 returns the said trip lever to its position shown in Figures 2 and 2A, wherein said lever 31 abuts with a stop lug 36. At this time the parts of the control and trip lever assembly assume the positions in which they are illustrated in Figure 2 and termed the neutral position. However, the said rearward movement of the control lever 2 has now initiated the operation of the automatic wind mechanism as will now be described.

Operation of the wind mechanism in dumping load

Figure 4:
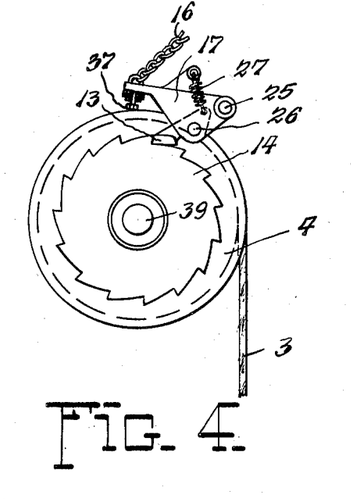
Figure 4 is a view of the cable winding drum and cable means cooperating therewith by which the doors are normally held closed when the vehicle is being loaded, together with the associated locking pawl devices cooperative with the ratchet wheel on the drum to hold the doors in the said normal closed position.
Figure 5:
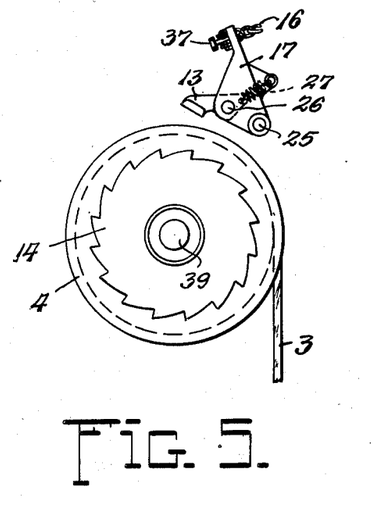
Figure 5 is a view similar to Figure 4, but illustrating the drum locking pawl as when disengaged from the ratchet wheel of the drum in order to permit dropping or opening movement of the doors.

Figure 4 illustrates, as previously described, the locking pawl 13 engaged with the ratchet wheel 14 as when holding the doors closed and when the wagon is loaded. The pull from the cable means 3 supporting the doors and leading to the drum 4 is checked by the pawl 13 in an obvious manner. The toggle lever 17 is fastened to an adjacent main bracket at the pivot point 25, and the combination linkage, incident to the connections between the parts 17 and 13, provides a toggle means utilizing the stop bolt 37 which rests on one of the flanges of the drum 4 to limit the downward movement of the toggle assembly parts, the member 13, of course, preventing the drum from rotating clockwise, and thus preventing unwinding of the cable means 3 therefrom. In Figure 5 is illustrated the position of the locking pawl and the toggle lever supporting same when the load has been dumped by releasing the doors 1 and unwinding action of the drum 4 as pawl 13 has been raised from engagement with the pawl 14. This action is performed by direct pull of the chain 16 on forward movement of the lever 2, as previously described. The spring 27 returns the pawl 13 to its proper working position before the lever 17 is lowered from the position of Figure 5 to its position of Figure 4, where the stop bolt 37 abuts with the flange of the drum. When the trip lever 31 is moved back to its position as shown in Figure 2, the neutral position of the parts 2 and 31, the toggle lever 17, see Figures 4 and 5, will have been returned to the position shown in Figure 4, permitting the locking pawl 13 to re-engage the ratchet 14. The dog will escape freely over the ratchet teeth 14 in the subsequent winding operation of the drum 4 that raises the cable means 3 and lifts the doors again to their closed position.

In Figure 7 the rocker arm 21 is shown in its operating position with its roller 24 adapted to engage the cam 20 on the wheel D. Under certain conditions the rocker shaft 22 is held in a position in which the arm 21 is upraised sufficiently that the cam 20 performs no function in reference thereto. Said last mentioned position is that in which the doors are closed and the wagon or vehicle A is ready for loading.

*Starting operation for the wind mechanism*

This operation is initiated when the lever 2 has been moved rearwardly to its intermediate or full line position of Figure 3, as above described. It will be recalled that the said action of the lever 2 exerts a pull upon the trip lever 31 and this trip lever 31, through the chain or cable 18, rocks the starting lever 19 from the position shown in Figure 22 in dotted lines, to the position shown in Figure 9.

Figures 11, 13, 14A, 14B, 15:
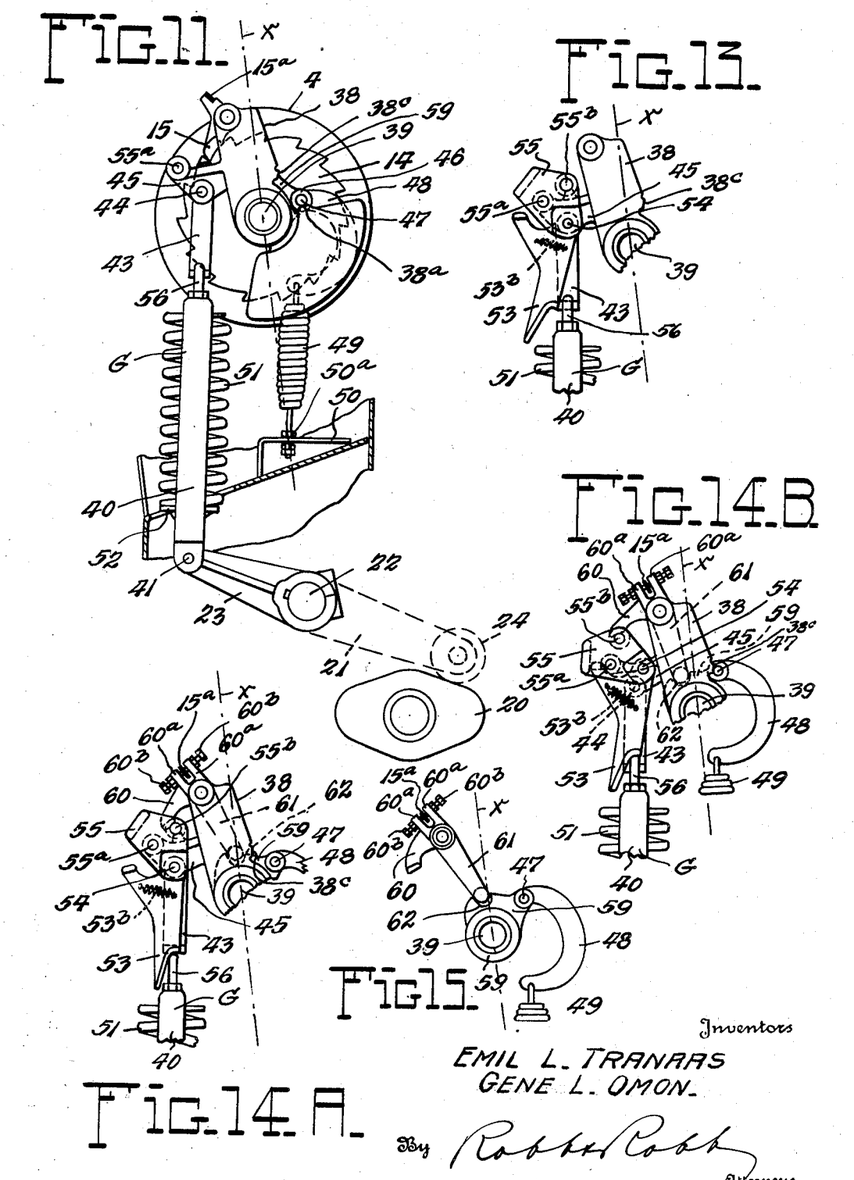
Figure 11 is a side view of the wheel operated rocker arm connector and wind mechanism by which the automatic closing of the doors is performed, the parts being shown in operative positions.
Figure 13 is a side view of a fragmentary nature, showing the latch devices in the normal or working position thereof at the time the door closing mechanism is in operation to move the doors to closed position.
Figure 14A is a view similar to Figure 13, but illustrating the adjustment of the parts as when the latch is allowed to be moved into place above the reciprocating unit or resilient connector assembly for the wind operating mechanism, upon expansion of the latter.
Figure 14B is a view showing the parts of Figure 14A as when the latch lever forces the equalizer lever upward so as to adjust the associated parts to the positions illustrated in Figure 22 and assumed thereby before the latch is moved to its latch-out position.
Figure 15 is a view showing the rotative collar and actuating arms therefor in their positions assumed before the latch action of the mechanism shifts the same, as also illustrated in Figure 14A.

Figure 11 is now referred to before describing the manner in which the winding operation for the cable means 3 is effected. It will be recalled that the rocker shaft 22 has the roller arm 21 adapted to engage the cam 20 so that the cam in cooperation with a spring 49, described later on, will impart to the shaft 22 partial rotary movements in opposite directions to raise and lower the arm 23. The arm 23 of the shaft 22 is attached by means of the resilient connector, previously mentioned, and generally designated G in Figure 11, to the working pawl actuating lever 38 which is mounted coaxial with the drum shaft 39 and freely rotatable thereon. The working pawl 15 on the lever 38 coacts with the ratchet wheel 14, as previously stated in the operation of the drum 4, whereby the cable means 3 is wound upon the drum to move the doors 1 of the vehicle body A to closed positions.

Figures 10, 18:
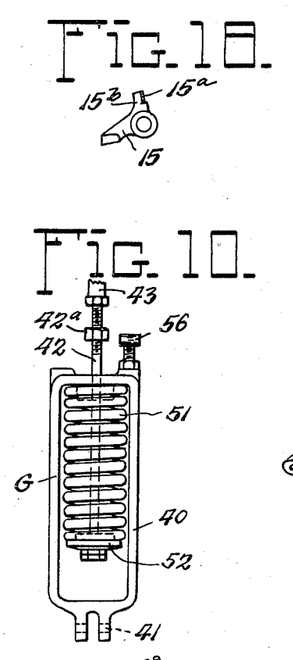
Figure 10 is a rear view of the reciprocatory unit comprising a contracting and expanding connector assembly employed for connecting the wheel actuator rocker arm with the wind or door closing ratchet mechanism, the connector being shown in partially expanded position.
Figure 18 is a side view of the working pawl.
Figure 22:
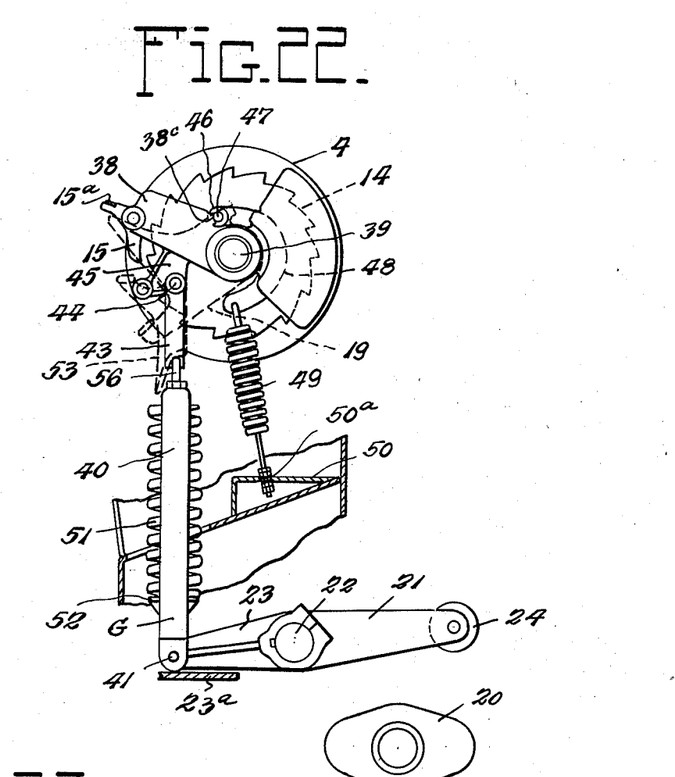
Figure 22 is a view similar to Figure 11, the parts of the mechanism illustrated being shown in inoperative or neutral positions, when the control lever assembly is in the position of Figures 2 and 2A.

The resilient connector G is of peculiar construction, comprising, as best seen in Figure 10, an outer yoke member 40, the lower end of which is pivotally connected at 41 to the rocker arm 23. Passing through the crosspiece at the upper end of the yoke member 40 is a reach rod 42 which is adjustably connected with a clevis link 43 pivotally connected in turn at 44 to an offstanding arm 45 carried by the lever 38. Adjacent the hub portion of the lever 38 a collar portion 59 freely rotatable on shaft 39, is provided and equipped with the pivot lug 46 adapted to swing or move in an arc such that the pivot 47 which connects the lug 46 to a curved link 48 may be shifted from the position shown in Figure 11 leftward to a point slightly beyond a line $x$ connecting the axis 39 and a point 50a at which a spring 49 is mounted to a bracket 50, as shown in Figure 22. The lower end of the curved link 48 is connected by spring 49 to the stationary bracket or like member 50. The action of these last mentioned parts will be later described more fully.

Surrounding the reach rod 42, see Figures 10 and 11, is a coil spring 51, the lower end of which bears against a stop disc 52 at the lower end of the reach rod, the upper end portion of the spring 51 engaging the underside of the top crossbar of the yoke 40.

The spring 51, when compressed, under operating conditions that will be more fully explained later on, permits elongation of the connector G, and, when expanded, contracts or shortens the connector G.

An adjustable nut or abutment member 42a limits the contraction of the connector G as necessary to obtain certain operations of parts cooperating with the connector G. When the mechanism is in a neutral or inoperative position, as illustrated in Figure 22, the spring 51 is not compressed. The only compression of the spring 51 at such time is the initial load compression, which is set up by the adjusting nut 42a on rod 42.

Figure 22 shows the parts illustrated in Figure 11 in inoperative position which they will assume after the completion of the winding operation when the doors are in closed position.

As will be seen from Figures 22, 13, 14, and 14A a latch 53 is provided pivoted at 54 to an equalizing lever 55 and held in engagement with an abutment bolt 56 carried by the upper end of the yoke member 40 of the connector G by means of a spring 53b when the parts are in a position as shown in Figure 14A. It will therefore be seen that when the device is in nonoperative or neutral position, as illustrated in Figure 22, the parts 48, 47, 46, 38, 45, 53, 43, 42, 51, 40, 23, 22, 21, and 24 are held in such position in contact with a stop 23a by the action of the spring 49 and it must be noted that the pivot 47 which establishes connection between the parts 48 and 46 is at this time at the left side of the line $x$ so that the pull exerted upon the parts enumerated above reacts upon the same to hold these parts in a position as shown in Figure 22 with the roller 24 out of engagement of cam 20.

In describing the operation of the actuating devices for causing winding movement of the drum 4, it will be understood that the parts of the connector G are in the condition of Figure 22 while the lever 2 assembly is in the condition shown in Figure 2. Under these conditions the winding mechanism is inoperative because the roller 24 is held out of contact with cam 20 in view of the action of spring 49 explained hereinbefore.

Figure 8:
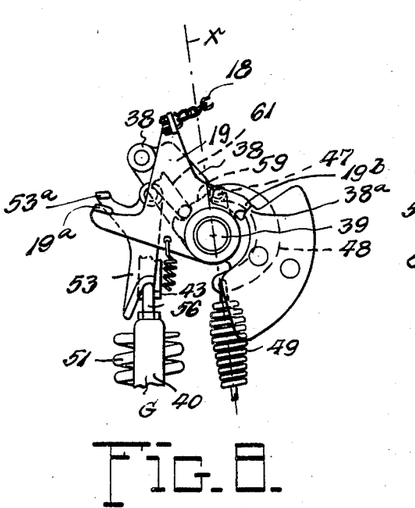
Figure 8 is a fragmentary side view illustrating the starting lever of the wind mechanism for closing the doors in an intermediate position during its movement for initiating winding operation when the control lever assembly is moved from dumping position toward closing position in Figure 3.
Figure 9:
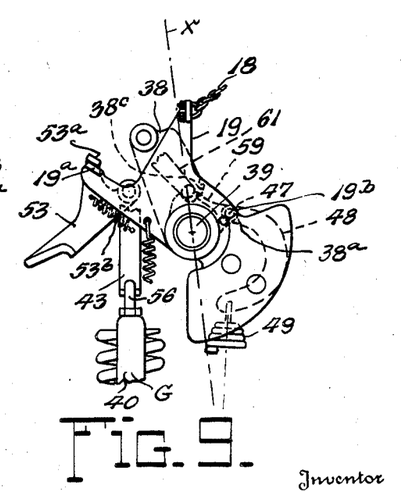
Figure 9 shows the position of the starting lever assembly after the manual control lever has been moved to assume the position shown in full lines in Figure 3 to effect commencement of operation of the automatic door closing mechanism.

Now it will be assumed that the lever 2 has been moved from the position of Figure 2A back to its full line position of Figure 3, thereby tripping the lever 31 to pull on the chain 18, said pull oscillating the starting lever 19 shown in Figure 8 to cause the abutment lug 19a of said lever to strike the coacting abutment lug 53a of the latch-out dog 53. The rightward shifting of the starting lever 19 under the pull of the chain 18 rocks the dog 53 to the position of Figure 9 by the cooperation of the abutment lugs 19a and 53a. The movement of the starting lever 19 causes also movement of lever 38 and pivot point 47 to the right from the position shown in Figure 22 to the position as illustrated in Figure 9 by means of the engagement of the abutment portions 19b and 38a on levers 19 and 38, respectively, and engagement of abutment 38b with pivot pin 47 of collar 59. The pivot point 47 is now shifted to the right side of the line x as seen in Figure 11, and the spring 49 forces the parts 38, G, 23, 21, and 24 to the position shown in this figure, until roller 24 contacts cam 20. The wind mechanism is now conditioned for operation, and the tension of spring 49 pulling connector G upwardly maintains the roller 24 in contact with the cam as long as the wind mechanism is in operation.

With the parts in this position, the winding mechanism is started into operation upon rotation of cam 20. The lever 2 which has been operated to cause such conditioning of the parts referred to above continues in its rearward movement to restore the tripping mechanism to its original or neutral position as shown in Figure 2, to thereby release lever 31.

The rotation of cam 20 causes oscillating movement of the roller 24, connector G, lever 38, and associated parts against the tension of the spring 49, thereby oscillating the working or feeding pawl 15 to shift the latter back and forth.

The pawl 15, as the lever 38 is carried to the right, engages a fresh tooth of the ratchet wheel 14 and turns the drum 4 in a counter-clockwise direction to wind up the cable means 3 and cause the doors 1 of the vehicle A to close. Of course, during the operation of the working pawl 15 to turn the drum 4 for winding in the cable means 3, the locking pawl 13 riding on the teeth of the ratchet wheel 14 maintains engagement with said teeth so as to prevent a backward or clockwise movement of the drum that would permit the cable means 3 to unwind when the working pawl 15 is being shifted to the right, as shown in Figure 11, to re-engage a fresh tooth of the ratchet wheel 14 in the winding operation of the drum. The above operation of the reciprocating connector G and actuating and ratchet parts associated therewith will continue until the doors are closed or stopped in their closing movement by some obstruction such as a stone, a piece of wood, or the like becoming lodged between the adjacent edges of the doors.

The latch or dog 53 is connected to the lever 38 by means of the equalizing lever 55 which is pivoted at 55a to the lever 38. The equalizing lever is omitted from the illustrations Figures 8 and 9 for purposes of clearness, but is fully shown in Figures 13, 20, 14A and 14B.

It is to be noted that the movement of collar 59 which is freely rotatable on shaft 39, is limited by the stops or abutments 38a and 19c, and will be described more fully later on.

*Mechanism for automatically stopping operation of the cable winding means*

The operation remaining to be described for a complete understanding of the invention is that involving the automatic stopping of the winding mechanism when the doors 1 reach their closed positions or are prevented from moving fully to closed positions by an obstacle lodged therebetween, as above referred to.

As seen best in Figures 13, 20, 14A and 14B, the dog or latch 53 is carried by a pivot 54 on the lower portion of the equalizing lever 55 that is pivoted at 55a on the arm 45 of the pawl supporting lever 38. The spring 51 is adjusted to a definite predetermined pressure so as not to be deflected under the normal pull applied to the connector G incident to the closing of the doors and the operation of the winding drum 4 by the ratchet mechanism 14—15 under the actuation of the cam 20 and associated rocker parts. However, at the end of the winding operation when the doors are closed and the cables are tight, the cable drum 4 and ratchet 14 cannot continue their rotation in a counter-clockwise direction, and the next power stroke of the lever arm 23 under the action of cam 20 will therefore cause a compression of the spring 51, as shown in Figure 10. In other words, the yoke 40 will move downward while the clevis link 43 and reach rod 42 remain stationary. The latch 53 now falls into place as shown in Figure 14A, in view of the action of spring 53b, and engages the abutment 56 of the yoke 40. The heavy compression of the spring is resisted by the pawl 15 at the upper end of the connector G and the cam 20 at the lower end thereof. The next upward movement of the arm 23 after the power stroke of cam 20, above referred to, permits expansion of the spring 51, and as a result thereof the yoke 40 will move upwardly, but the reach rod 42, clevis link 43, and lever 38 will remain stationary until the adjustment nut or abutment 42a on the reach rod 42 is engaged by the upper portion of the yoke 40.

When the spring 51 expands in the above manner, the pressure thereof is exerted against the dog or latch 53, which is in contact with the abutment member 56. The dog or latch 53 thus forces the equalizer lever 55 to rotate counter-clockwise about pivot 55a incident to said expansive spring pressure as shown in Figure 14B. This movement of the equalizer lever 55 is transferred to the collar 59 which carries the lug 46 connected to the link 48 as previously mentioned. Said equalizer lever 55 has a pin or stud 55b thereon which engages an arm 60 of a bell crank lever 61, the lower end of which is inter-engaged with the collar 59 by a notch 62. Thus in the rotary movement of the equalizer lever 55 its pin or stud 55b strikes the arm 60 and rocks the lower bell crank arm 61 to turn the collar 59 in a counter-clockwise direction, thereby somewhat raising and shifting to the left the link 48 and its pivot 47 against the tension of the spring 49 attached thereto. The pivot 47, however, remains at the right of the vertical centerline of shaft 39.

Figure 19:
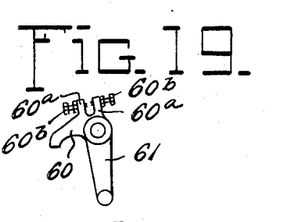
Figure 19 is a side view of the bell crank associated with the working pawl.
Figure 20:
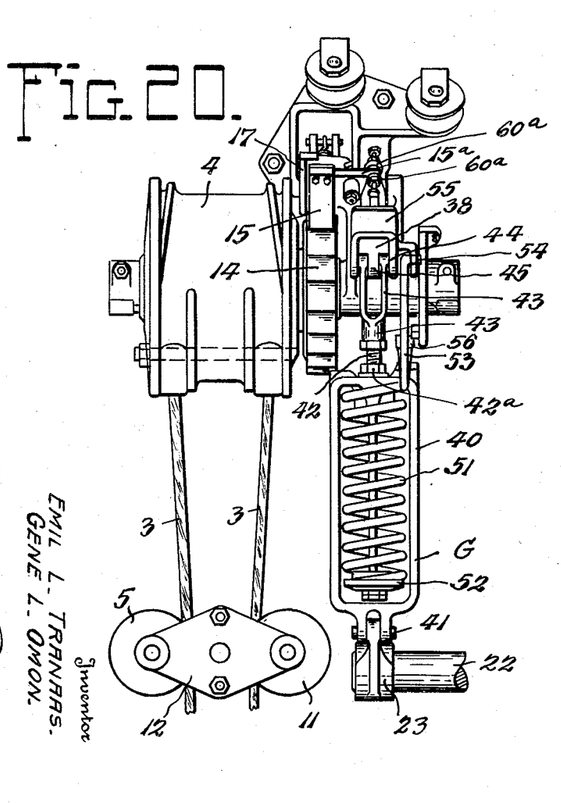
Figure 20 is a rear view of the winding drum and the automatic wind mechanism with the casing illustrated in Figure 21 removed, certain actuating parts, including the reciprocating actuating unit, being also illustrated.
Figure 21:
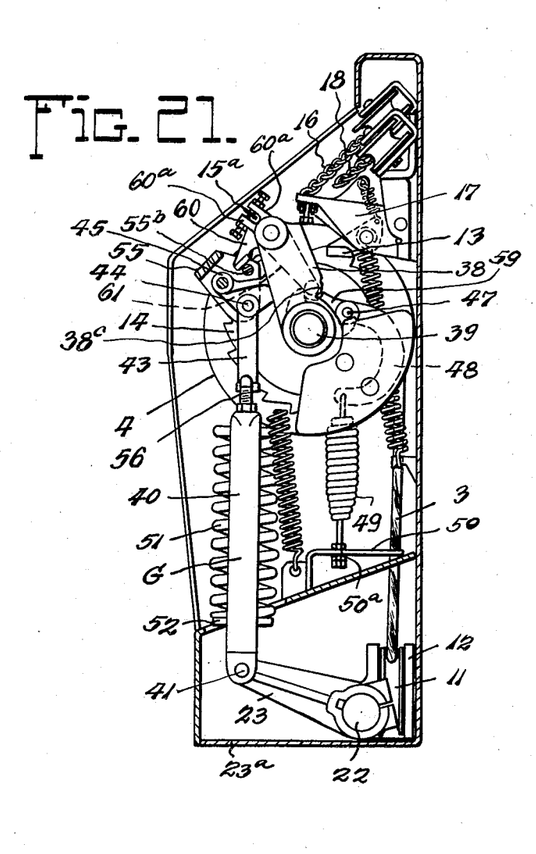
Figure 21 is a sectional view through the casing which encloses the parts of Figure 20 and illustrating the general arrangement of the automatic operating mechanism for closing the doors, otherwise termed herein a winding mechanism.

As seen in Figure 19, the bell crank 60—61 has a pair of lugs 60a at its upper portion with adjustable screws 60b, one on each lug. The inner ends of the screws 60b engage a leaf spring 15a on the working pawl 15, said spring offstanding laterally from a projection 15b of said pawl 15, see Figures 18 and 20. Therefore, when the bell crank arm 60 is raised by the pin 55b of the equalizer lever 55, the rocking of the bell crank through the shifting rightward of the lugs 60a and screws 60b places the leaf spring 15a under tension. However, the pawl 15 connected therewith is still held in engagement with the ratchet wheel 14 under the heavy force of the spring 51.

The above operation takes place before the yoke 40 engages the abutment or adjustment nut 42. With the leaf spring 15a under compression and the pivot point 47 partially shifted toward the line x, the yoke, upon further upward movement under the action of spring 51, shifts the whole mechanism 55, 38, 60, 61, and 15 a certain distance toward the right around shaft 39. The ratchet wheel 14 turns slightly in a clockwise direction with the parts enumerated above, until one of its teeth, next to the pawl 13, engages the same, whereupon the ratchet wheel 14 and drum 4 are locked against further unwinding rotation under the gravitative pull of the doors now in closed position. The pressure on pawl 15 is now released and leaf spring 15a which is under tension raises pawl 15 out of operative engagement with the ratchet wheel 14, thereby incapacitating this working or cable winding pawl until the winding mechanism is subsequently thrown into action again by the rearward movement of the lever 2. Obviously, the pawl 15 must be disengaged from the wheel 14 when the doors 1 are closed, so as to place the ratchet wheel under the control of the locking pawl 13 to permit the latter, when upraised, to release the ratchet wheel 14 and drum 40 for the unwinding action of the cable means 3 and opening of the doors.

Figures 15 and 14A show the position of the collar 59 before the above described operation, and Figure 14B shows the new position assumed by the collar after it has been actuated through the medium of the equalizer lever 55.

The next working stroke causes the lever 38, with pawl 15 disengaged from the ratchet wheel 14, to move with the collar 59 in a counter-clockwise rotation to a point where the pivot connection 47 is shifted to the left past the line x, thereby causing the spring 49 to exert its pull on the entire mechanism on the opposite or left side of the line x. By reason of the connection of the main wind assembly levers and the rocker shaft 22 by the reach rod, this reversing of the action of the spring pull of the spring 49 lifts the rocker arm 21 and its roller free from the cam 20, until arm 23 abuts against the stop 23a as shown in Figure 22. In other words, the part 21 is lifted sufficiently high that the cam 20 no longer actuates the same and the rocker shaft 22 and associated parts, during the rotation of the wheel D and said cam 20. In the last mentioned adjustment of the various parts, it will be apparent that the operating means intermediate the cam 20 and the pawl carrying lever 38, for effecting the winding up of the cable means 3, is latched out of operation and becomes therefore inactive by the automatic action of the parts as just described, and this latching out operation will take place as soon as the doors are closed, and spring 51 is under a certain predetermined tension, or as soon as the doors are prevented from closing or close only partially, if an obstacle happens to be caught between them and the spring 51 is again placed under the certain tension and in the above manner the operation of the cable winding mechanism is caused to cease by the automatic instrumentalities referred to.

As stated above the pawl 15 is raised out of cooperation with the ratchet wheel 14 upon actuation of the equalizing lever 55 and is maintained in such position until the parts are returned to the position shown in Figure 11 upon conditioning of the parts for winding operation.

*General operation summarized*

Assuming the parts of the invention to be in the positions of Figure 1, a complete cycle of operation of the various devices may be summarized as follows:

The doors 1 are closed and the body A contains a load of material to be carried off and dumped. When the dumping point is reached the operator pulls forwardly on the lever 2, disengages the ratchet locking dog 13, and the cable on the drum 4 unwinds under the downward pull of the doors and load supported thereby, transmitted to the drum through the cable means 3. The forward movement of the lever effects actuation of the pawl 13 through the chain, cable, or flexible connection 16. The load being free or delivered from the vehicle A, the operator pushes the lever 2 rearwardly to cause interlocking of said lever with the trip lever 31 to exert a forward pull on the chain, cable, or flexible connection 18 which leads to the starting lever 19. The starting lever 19 disengages the dog or latch 53 and rotates the lever 36, thus shifting pivot 47 to the right and causing operation of the spring 49 to shift the actuating or rocker arm 21 and its roller downwardly into the path of the wheel cam 20.

The wheel cam 20 is now rendered operative in relation to the cable winding drum 4 and means for actuating the latter in its winding movement. The up and down movement of the arm 21 is communicated through the reciprocatory connector G to the working pawl carrying lever 38 and said lever 38 actuates the ratchet wheel 14 for the drum winding movement, the drum being held locked against clockwise movement by the locking pawl 13. When the doors are closed or meet with a resistance to further movement corresponding to their closing adjustment, the connector G is operated in the manner previously described, so as to permit the dog or latch 53 to again engage the abutment member 56 and the collar 59, link 48, and spring 49 are caused to be operated as described, so as to cause the winding mechanism to be put out of action and so maintained by cooperation of the latching-out dog or latch 53 aforesaid.

Figure 23:
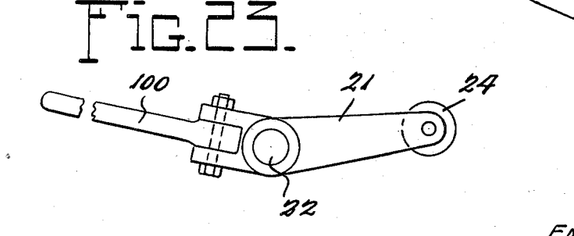
Figure 23 illustrates an arrangement by which the lever 21 and shaft 22 may be manually operated.

Provisions may be made for manual operation of the winding mechanism to permit closing of the door when the vehicle is not in motion. Such manual means may preferably comprise a hand lever 100 detachably connected to lever 21 as shown in Figure 23, and obviously up and down movement of said hand lever 100 will permit operation of the winding mechanism in the same manner as described in reference to cam 20. When manual operation is desired cam 20 should be placed in such a position in regard to roller 24 by turning wheel D as to permit such operation.

It may also be stated that when spring 49 acts on the right side of line x upon pivot and abutment pin 47, its tension is transmitted to lever 38 over abutment 38a by contact of said pin 47 with the latter, while the action of spring 49 with pin 47 at the left side of the line x causes engagement between pin 47 with abutment 38c thus forcing the parts of the mechanism to perform a counter-clockwise movement around shaft 39. This action of spring 49 and abutment pin 47 has been clearly brought out in Figures 9 and 22. However, when the collar 59 is moved by bell crank 60 due to expansion of spring 61, pin 47 is moved away from its contact with abutment 38a and does not contact abutment 38c until pivot pin 47 has been moved to the left of the line x of the mechanism during door closing operation.

Having thus described our invention, what we claim as new and desire to secure by Letters Patent of the United States, is—

1. In combination, a vehicle comprising a dumping door and means for effecting opening and closing operations of said dumping door, including release mechanism for effecting the opening of the door, closing mechanism for causing the door to be restored to its closed position, and a manually operable controller operable to effect release action of said release mechanism and means for connecting the controller with the door closing mechanism rendered operative incident to door releasing operation of said controller for initiating action of the door closing mechanism upon subsequent movement of the controller, said connecting means including a member positively and non-yieldably engageable with the controller on movement of the latter in one direction and permitting movement of the controller in another direction without such positive engagement.

2. In combination, a vehicle comprising a dumping door and means for effecting opening and closing operations of said dumping door, including release mechanism for effecting the opening of the door, closing mechanism for causing the door to be restored to its closed position, and a manually operable controller common to said release mechanism and said door closing mechanism for governing the operation of the same, and including connecting instrumentalities yieldably engageable with the controller during release action of the doors by movement of the controller in one direction and positively engageable with the controller to effect closing action of the doors by movement of said controller in an opposite direction.

3. In a dumping vehicle including a door, in combination, door closing mechanism, door releasing mechanism, driving means for the door closing mechanism, said door closing mechanism comprising a winding device and a cable connecting said device with the door, and also including an expansible and contractible connector adjustable in one way to discontinue the driving action of the driving mechanism on the door closing mechanism, and adjustable in another way to cause such driving action, a kick-off dog for holding said adjustable connector adjustable in one way aforesaid and disengageable to effect its adjustment in the other way aforesaid, a control lever connected with the release mechanism to operate the same when the lever is moved in one direction, and trip means between the control lever and said dog operable by movement of the lever in another direction to trip the dog and disengage it from the adjustable connector as described.

4. In combination, a vehicle comprising a dumping door and means to hold it in closed position, mechanism for effecting closing of the door, and control means for releasing the door holding means and initiating the operation of the door closing mechanism comprising a pair of relatively movable members, one of which is connected to the door holding means and the other of which is connected to the door closing mechanism, one of said members being movable into position for releasing the door and having means positively engageable in one direction only with the other member to condition it to move the other member for subsequent door closing operation.

5. In combination, a vehicle comprising a dumping door and means to hold it in closed position, mechanism for effecting closing of the door, control means for releasing the door holding means and for initiating the operation of the door closing mechanism comprising a pair of relatively movable members, one of which is connected to the door holding means and the other of which is connected to the door closing mechanism, one of said members including manually actuatable means shiftable in one direction to operate one of the door holding and door closing means aforesaid and having means positively engageable in one direction only with the other member to thereby condition it to operate the other of said means upon movement from said shifted position.

6. In combination, a vehicle comprising a dumping door and means to hold it in closed position, mechanism for effecting closing of the door, control means for releasing the door holding means and initiating the operation of the door closing mechanism comprising a pair of relatively movable levers, one of which is connected to the door holding means and the other of which is connected to the door closing mechanism, one of said levers having a pawl pivotally mounted thereon and operatively engageable with the other lever upon movement of the first-mentioned lever in one direction only, said second-mentioned lever being shiftable by said pawl upon reverse movement of the first-mentioned lever, and means for pivotally shifting said pawl to release it from engagement with the other lever aforesaid as the first-mentioned lever approaches the end of its reverse movement.

7. In combination, a vehicle comprising a dumping door and means to hold it in closed position, mechanism for effecting closing of the door, control means for releasing the door holding means and initiating the operation of the door closing mechanism comprising a pair of relatively movable levers pivoted on a common axis, one of which is connected to the door holding means and the other of which is connected to the mechanism for effecting closing of the door, and one of said levers having manually operable means for shifting it in one direction to effect door releasing operation and having means to establish connection with the other of said levers to actuate the same to initiate door closing operation upon reverse of the movement of the manual means.

EMIL L. TRANAAS.
GENE L. OMON.